United States Patent

Tsunai

[11] Patent Number: 5,966,172
[45] Date of Patent: Oct. 12, 1999

[54] SIGNAL PROCESSING CIRCUIT FOR SOLID STATE IMAGE SENSOR HAVING A STRUCTURE FOR SUPPRESSING A RESET NOISE

[75] Inventor: Shiro Tsunai, Tokyo, Japan

[73] Assignee: NEC Corporation, Tokyo, Japan

[21] Appl. No.: 08/627,066

[22] Filed: Apr. 3, 1996

Related U.S. Application Data

[62] Division of application No. 08/354,829, Dec. 8, 1994, Pat. No. 5,539,457.

[30] Foreign Application Priority Data

Dec. 8, 1993 [JP] Japan ................................. 5-308243

[51] Int. Cl.$^6$ ................. H04N 5/217; H01L 27/148; H03K 17/56
[52] U.S. Cl. ................. 348/241; 257/239; 327/436
[58] Field of Search .................................. 348/241, 250, 348/294, 308; 257/239; 327/491, 77, 80, 436, 437

[56] References Cited

U.S. PATENT DOCUMENTS 5,600,451  2/1997  Maki ........................................ 348/241
5,729,285  3/1998  Petersin et al. ......................... 348/241

*Primary Examiner*—Wendy Garber
*Assistant Examiner*—Alicia M. Harrington
*Attorney, Agent, or Firm*—Young & Thompson

[57] ABSTRACT

A signal processing circuit for a solid state image sensor, includes a charge detection circuit for outputting a signal output from the image sensor, a first inverting amplifier receiving the signal output, and a second inverting amplifier having a source-grounded MOS transistor having a gate connected to receive an output of the first inverting amplifier. A threshold of the MOS transistor is set to be the same as a black reference voltage in the input signal applied to the MOS transistor. Thus, a reset noise included in the signal output from the image sensor is suppressed or removed.

6 Claims, 10 Drawing Sheets

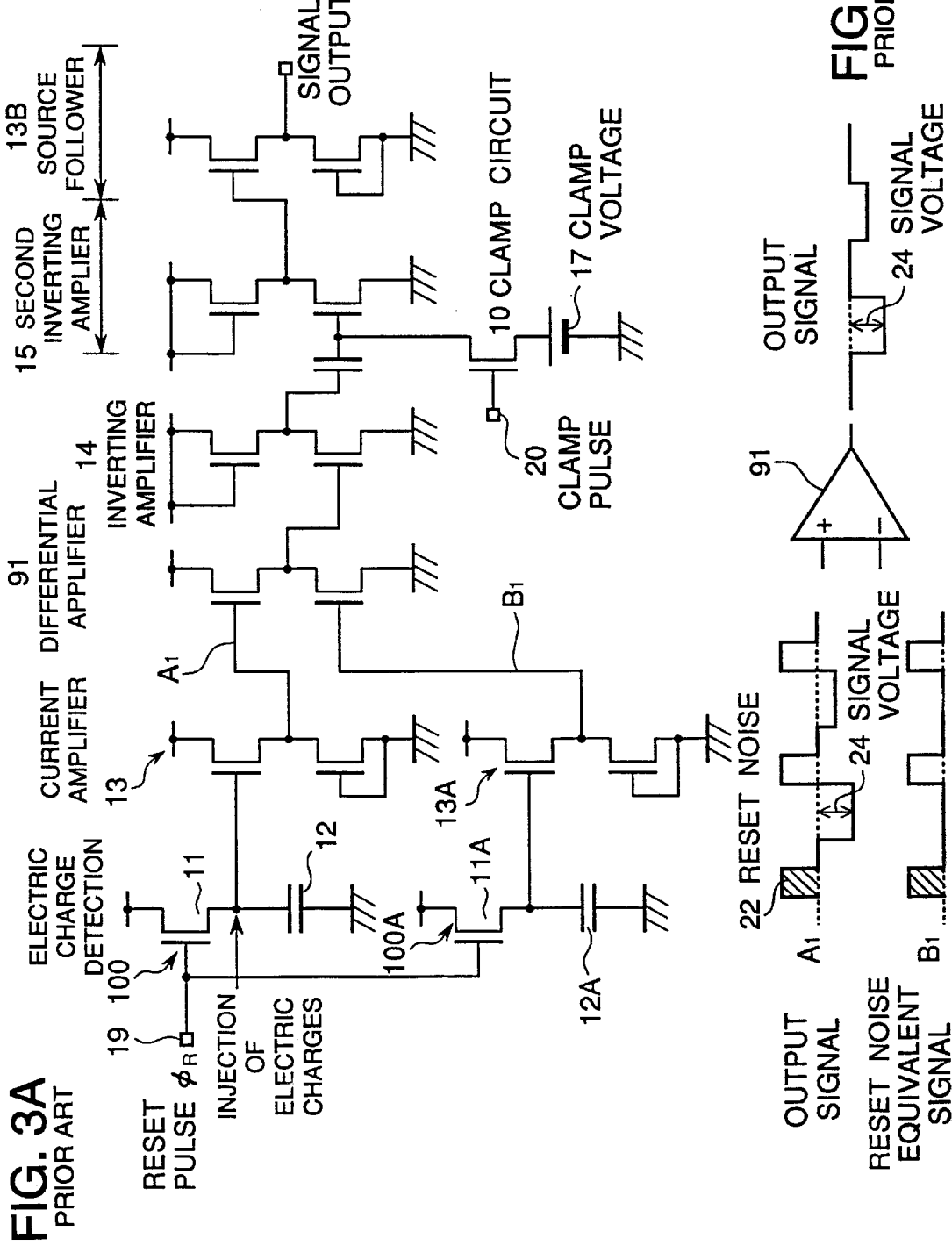

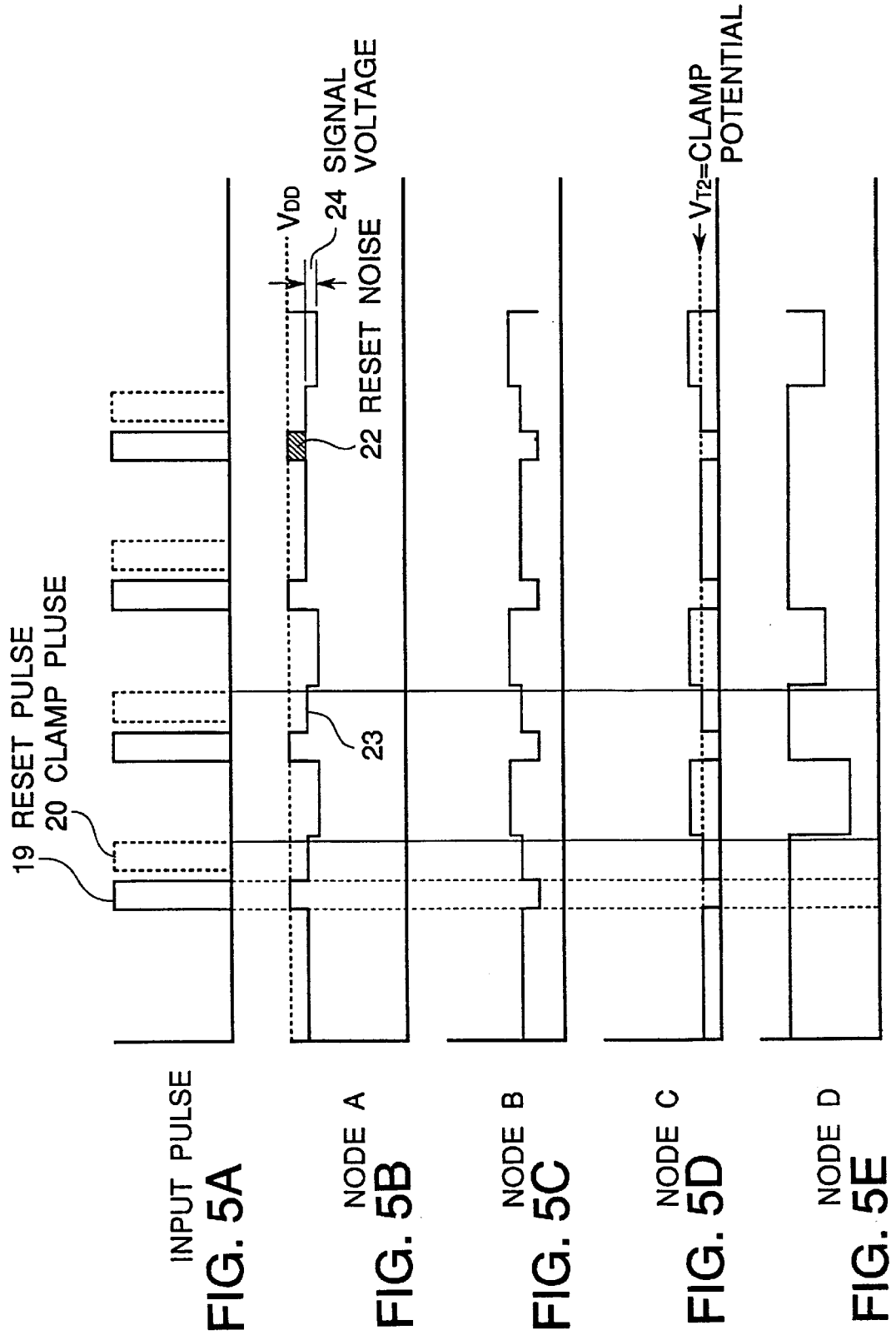

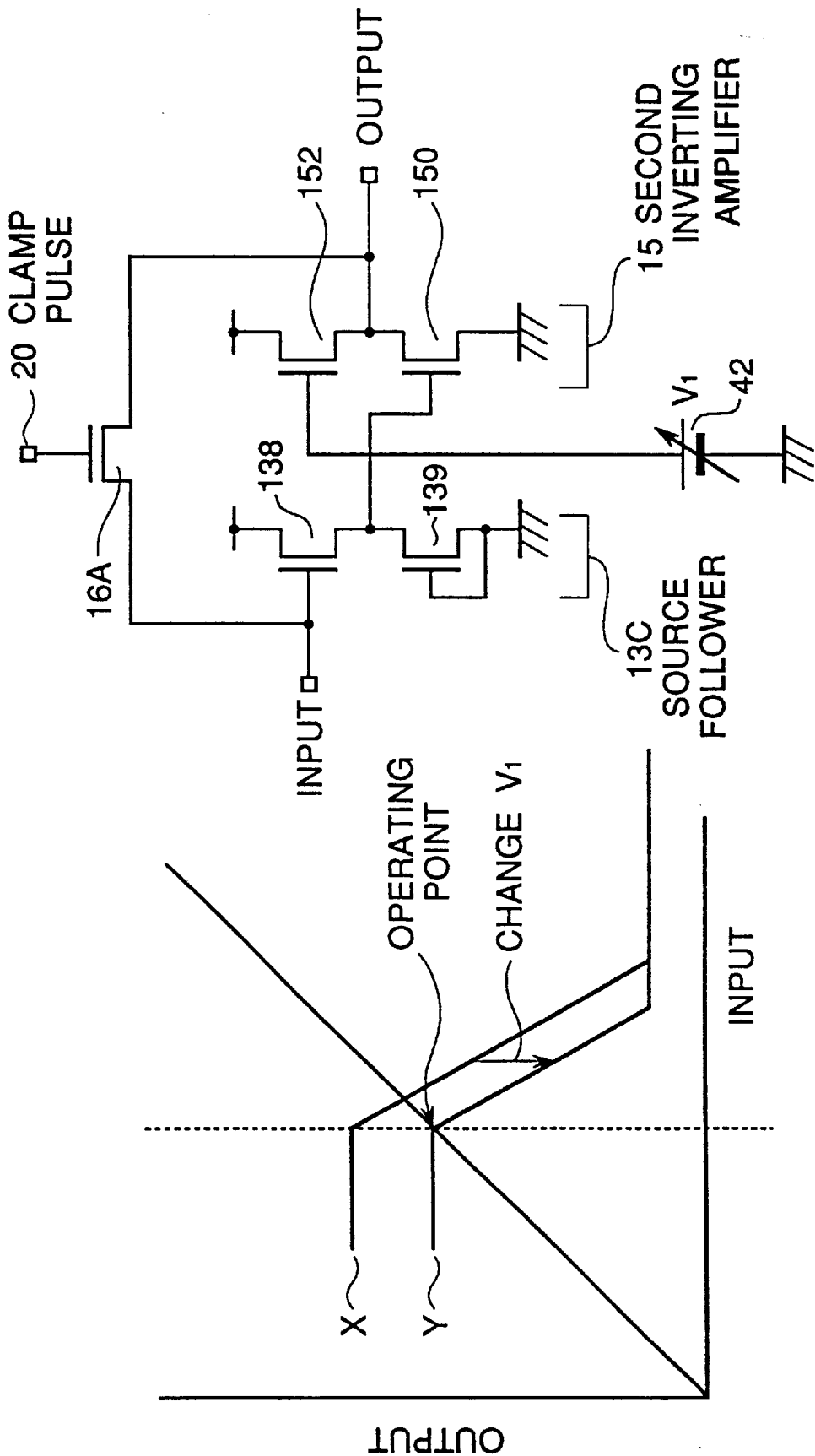

SIGNAL PROCESSING CIRCUIT FOR SOLID STATE IMAGE SENSOR HAVING A STRUCTURE FOR SUPPRESSING A RESET NOISE

This application is a division of application Ser. No. 08/354,829, filed Dec. 8, 1994, now U.S. Pat. No. 5,539,457.

BACKGROUND OF THE INVENTION

1. Field of the Invention

The present invention relates to a signal processing device, and more specifically to a signal processing device for suppressing a noise in a signal outputted from a charge transfer device type solid state image sensor.

2. Description of Related Art

Referring to FIG. 1, there is shown a conventional charge transfer device type image sensor, typified particularly by a CCD (charge coupled device) type image sensor, generally designated by Reference Numeral 71.

As extremely simply depicted in FIG. 1, the CCD image sensor 71 is basically composed of a number of photosensor cells such as photodiodes 72 arranged in the form of a matrix having a plurality of rows and a plurality of columns, a plurality of vertical charge transfer devices 73 each located along a corresponding column of photodiodes so as to receive an electric charge from all the photodiodes of the corresponding column in parallel and to vertically transfer the received electric charges, a horizontal charge transfer device 79 located along an output end of all the vertical charge transfer devices so as to receive an electric charge from all the vertical charge transfer devices in parallel and to horizontally transfer the received electric charge, and an electric charge detection circuit 74 having an input coupled to an output end of the horizontal charge transfer device.

An analog signal outputted from the electric charge detection circuit 74 is caused to pass through a buffer 78, a clamp circuit 75, a sample-hold circuit 76, a low pass filter 77, and an amplifier 80 for various signal processings. An output of the amplifier 80 is connected to an output terminal "OUTPUT". Thereafter, in some cases, the analog signal outputted from the amplifier 80 is supplied an A/D converter (analog-to-digital converter) (not shown), so that a digital signal is obtained.

In various solid image sensors including the above mentioned conventional CCD solid state image sensor, a so called "reset noise" occurs when there is used a charge detection circuit such as a floating diffusion amplifier type (called a "FDA type" hereinafter) charge detection device or a ring junction gate type charge detector.

Now, for the purpose of explaining a mechanism of generation of the reset noise, the FDA type charge detection device will be explained with reference to FIG. 2, which is a partial diagrammatic sectional view of an output part of the CCD structure including a typical FDA type charge detection device, in combination with potential diagrams showing changes of potentials at various portions for illustrating a charge transfer process.

As shown in FIG. 2, the output part of the CCD structure includes an N-type silicon substrate 85, which has a P-well 86 formed at a principal surface thereof. An N-well 87 is further formed on a surface of the P-well 86. The N-well 87 is terminated by a reset drain 82 which is formed in an end portion of the P-well 86.

A gate oxide film (not shown) is formed to cover the principal surface of the semiconductor substrate 85. On the gate oxide film (not shown), a plurality of transfer electrodes and a final transfer gate electrode (both of which are provided for the CCD transfer structure but are not shown for simplification of the drawing), an output gate electrode 83, and a reset gate electrode 81 are formed in the named order toward to the reset drain 82, so that the reset gate electrode 81 is positioned adjacent to the reset drain 82.

A portion of the N-well 87 between the output gate electrode 83 and the reset gate electrode 81 constitutes an electrically floating diffusion region 84. Between this floating diffusion region and the P-well 86, a charge detection capacitor is formed. This floating diffusion region 84 is connected through an output line 84A to an input of a source follower 13. In addition, a reset transistor is formed of the reset drain 82, the reset gate 81 and the floating diffusion region 84.

With the above mentioned arrangement, the reset drain 82 is biased to a fixed reset drain voltage, for example, a voltage supply voltage $V_{DD}$, and the output gate 82 is biased to an appropriate fixed voltage $V_{OG}$ that does not become a hindrance in the charge transfer. In addition, a reset signal $\phi_R$ is applied to the reset gate electrode 81. When the reset signal $\phi_R$ is applied to the reset gate electrode 81, the charge detection capacitor (floating diffusion region) 84 is reset to the same potential as that of the reset drain voltage $V_{DD}$ connected to the reset drain 82.

After the charge detection capacitor 84 is reset, the charge detection capacitor is put in a floating condition. In this condition, a signal electric charge transferred from the CCD transfer structure is injected into the charge detection capacitor 84, so that a potential on the charge detection capacitor 84 changes, from the potential on the charge detection capacitor 84 just after the charge detection capacitor 84 is reset, in proportion to the amount of the signal electric charge accumulated in the charge detection capacitor 84. Here, in the case that the signal electric charge is electrons, the lower the potential on the charge detection capacitor 84 is than the after-reset potential which corresponds to a reference level of a black, the more the amount of the signal electric charge accumulated in the charge detection capacitor 84 is. Thus, this change in the potential on the charge detection capacitor 84 is detected as an output signal.

As shown in the potential diagram at the timing $T_1$ in FIG. 2, the reset transistor is conductive (ON) at the timing $T_1$. At this time, a voltage substantially equal to the voltage supply voltage $V_{DD}$ is obtained from the output line 84A.

As shown in the potential diagram at the timing $T_2$ in FIG. 2, the reset transistor is brought from the ON condition into an OFF condition at the timing $T_2$. At this time, the charge staying under the reset gate 81 is distributed into a region of the reset drain 82 and a region of the charge detection capacitor 84. The charge flowed into the region of the charge detection capacitor 84 causes to further drop the potential on the charge detection capacitor 84, to a potential lower than the reset drain voltage. Thus, the reset noise occurs.

This reset noise is determined by ambient temperature, the capacitance of the charge detection capacitor and the gate capacitance. The reset noise is also called a "partition noise", which is discussed in detail in N. TERANISHE et al., "Partition Noise in CCD Signal Detection", IDEM— INTERNATIONAL ELECTRON DEVICE MEETING, Dec. 1–4, 1985, pp452–455, the disclosure of which is incorporated by reference in its entirety into the present application.

This reset noise is on the order of 500 mV, which is larger than a level of an output signal in a CCD image sensor internally containing a voltage amplifier. In addition, the amplitude of the reset noise is independent of the output signal itself, and therefore, if the reset noise is superposed on the output signal, a dynamic range of the signal processing circuit is restricted by the reset noise, so that it is difficult to obtain a satisfactory signal amplitude. In particular, this problem is remarkable, when a gain of the voltage amplifier is made large because the signal voltage is small.

In a conventional circuit as shown in FIG. 3 for cancelling the reset noise, a charge detection circuit 100 is added with a circuit 100A for generating a signal equivalent to the reset noise superposed on the signal detected in the charge detection circuit 100. The charge detection circuit 100 includes a transistor 11 corresponding to the reset transistor formed of the reset drain 82, the reset gate 81 and the floating diffusion region 84 shown in FIG. 2, and a capacitor 12 corresponding to the charge detection capacitor 84 between the floating diffusion region and the P-well 86 shown in FIG. 2. A gate of the transistor 11 is connected to receive a reset pulse φR. Similarly, the reset noise equivalent signal generating circuit 100A includes a transistor 11A equivalent to the transistor 11 and a capacitor equivalent to the capacitor 12, and a gate of the transistor 11A is similarly connected to receive the reset pulse φR.

An output of the charge detection circuit 100 is applied through a current amplifier 13 to a first input A1 of a differential amplifier 91, and similarly an output of the reset noise equivalent signal generating circuit 100A is applied through a current amplifier 13A to a second input $B_1$ of a differential amplifier 91. Thus, this differential amplifier 91 outputs a differential signal, in which the reset noise is cancelled.

The differential signal outputted from the differential amplifier 91 is outputted through a first inverting amplifier 14, a second inverting amplifier 15 associated with a clamp circuit 10, and a source follower output circuit 13B.

The above mentioned conventional circuit requires, in addition to the charge detection circuit 100, the reset noise equivalent signal generating circuit 100A for generating a signal equivalent to the reset noise superposed on the signal detected in the charge detection circuit 100. Therefore, an area occupied by the circuit is large, which is not suitable to a pattern design for a high density circuit. In addition, in order to ensure that the reset noise is efficiently suppressed by the differential amplifier, it is necessary that the reset noise equivalent signal generating circuit 100A is wired and located with a good balance. This is not suitable to microminiaturization.

Furthermore, since the differential amplifier itself is complicated, a circuit design is difficult.

SUMMARY OF THE INVENTION

Accordingly, it is an object of the present invention to provide a signal processing circuit for a solid image sensor, which has overcome the above mentioned defect of the conventional one.

Another object of the present invention is to provide a signal processing circuit for a solid image sensor, capable of efficiently suppressing the reset noise, without the reset noise equivalent signal generating circuit and the differential amplifier which were required in the prior art circuit.

The above and other objects of the present invention are achieved in accordance with the present invention by a signal processing circuit for a solid state image sensor, the signal processing circuit including a charge detection circuit for outputting a signal output from the image sensor, a first inverting amplifier receiving the signal output, a second inverting amplifier receiving an output of the first inverting amplifier, and a clamp circuit including a constant voltage source and a switching means for selectively supplying the constant voltage to the second inverting amplifier, the second inverting amplifier including a source-grounded MOS transistor having a gate connected to receive the output of the first inverting amplifier, and the constant voltage of the constant voltage source being set to be not smaller than a threshold of the MOS transistor but smaller than an intermediate voltage of an operating voltage range of the second inverting amplifier.

According to a second aspect of the present invention, there is provided a signal processing circuit for a solid state image sensor, the signal processing circuit including a charge detection circuit for outputting a signal output from the image sensor, a first inverting amplifier receiving the signal output, a source follower receiving an output of the first inverting amplifier, a second inverting amplifier receiving an output of the source follower, a switching means connected between an output of the second inverting amplifier and an input of the source follower to construct a feedback type clamp circuit, the second inverting amplifier including a source-grounded MOS transistor having a gate connected to receive the output of the source follower, an operating voltage being set to be not smaller than a threshold of the MOS transistor but smaller than an intermediate voltage of an operating voltage range of the second inverting amplifier.

The above and other objects, features and advantages of the present invention will be apparent from the following description of preferred embodiments of the invention with reference to the accompanying drawings.

BRIEF DESCRIPTION OF THE DRAWINGS

FIG. 3 is a circuit diagram of a conventional signal processing circuit including a circuit for cancelling the reset noise;

FIG. 5 is a timing chart illustrating the operation of the signal processing circuit shown in FIG. 4;

FIG. 8 is a characteristic graph illustrating a method for determining an operating point in the second embodiment;

DESCRIPTION OF THE PREFERRED EMBODIMENTS

Figure 4:
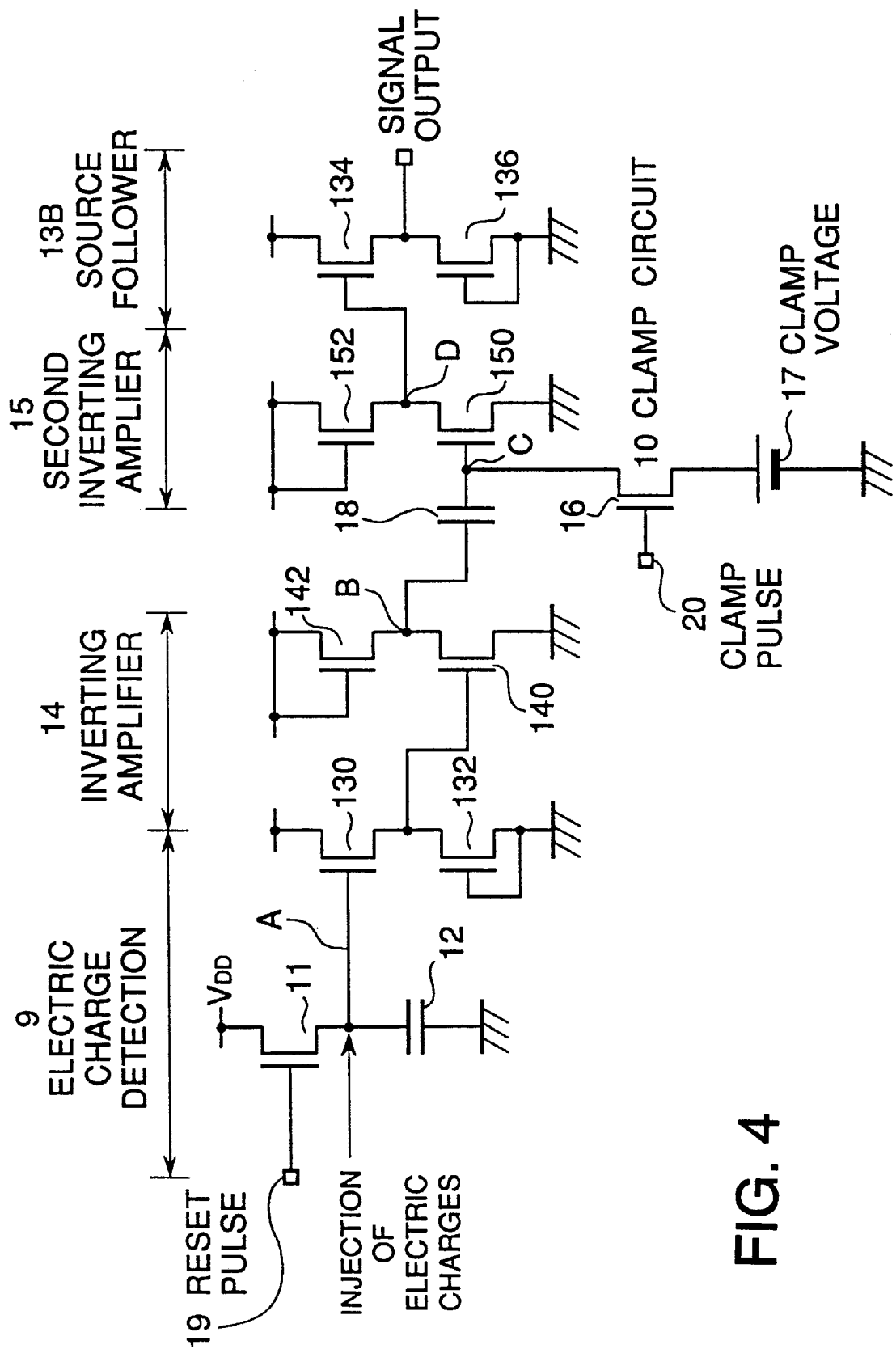
FIG. 4 is a circuit diagram of a first embodiment of the signal processing circuit in accordance with the present invention including a function for cancelling the reset noise.

Referring to FIG. 4, there is shown a circuit diagram of a first embodiment of the signal processing circuit in accordance with the present invention including a function for cancelling the reset noise.

The shown first embodiment includes a FDA type charge detection circuit 9, a clamp circuit 10, two inverting amplifiers 14 and 15 and a source follower 13B, connected as shown in the drawing.

Figure 1:
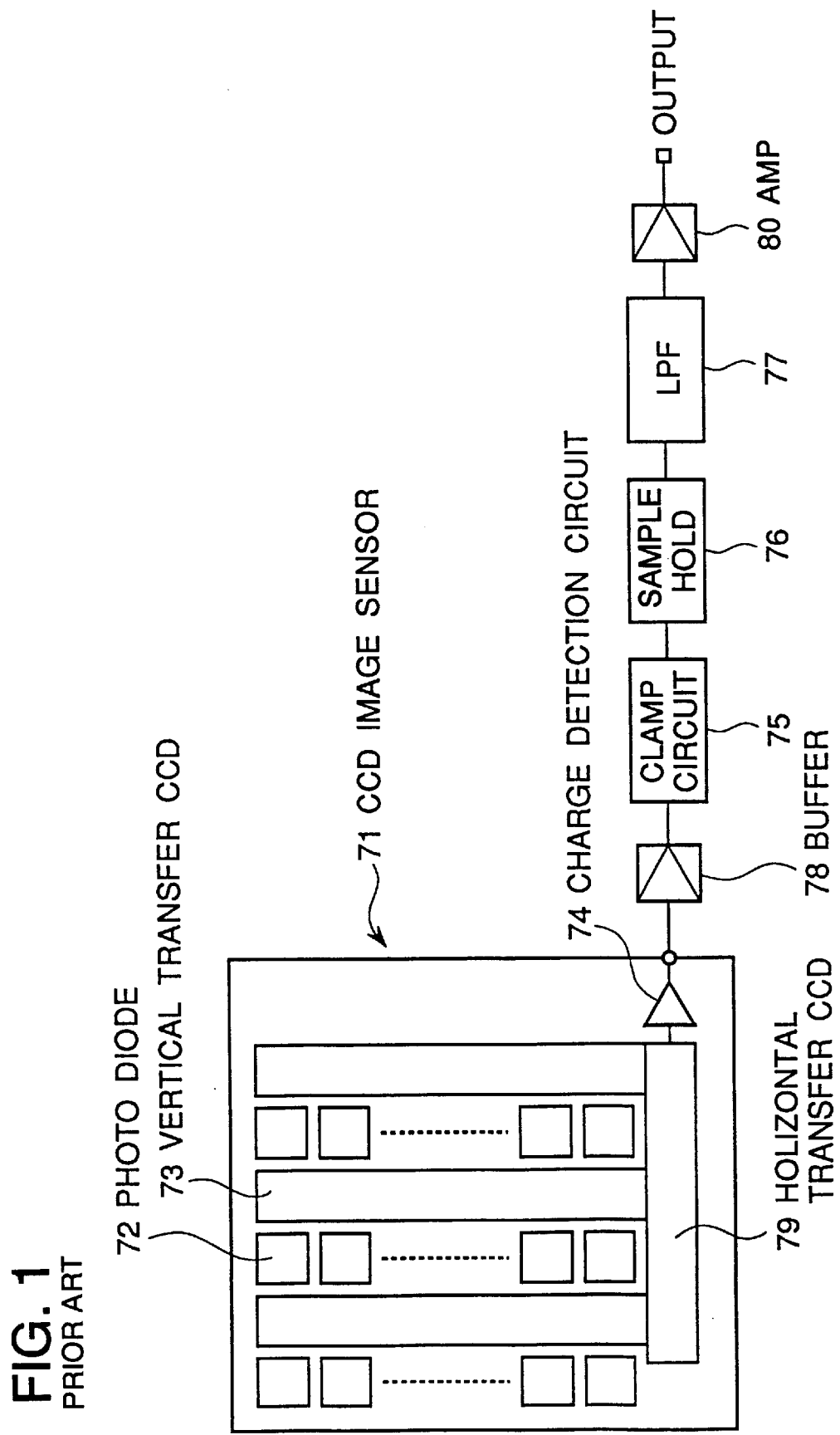
FIG. 1 is a block diagram of a conventional circuit for processing an analog signal outputted from a CCD type image sensor.
Figure 2A:
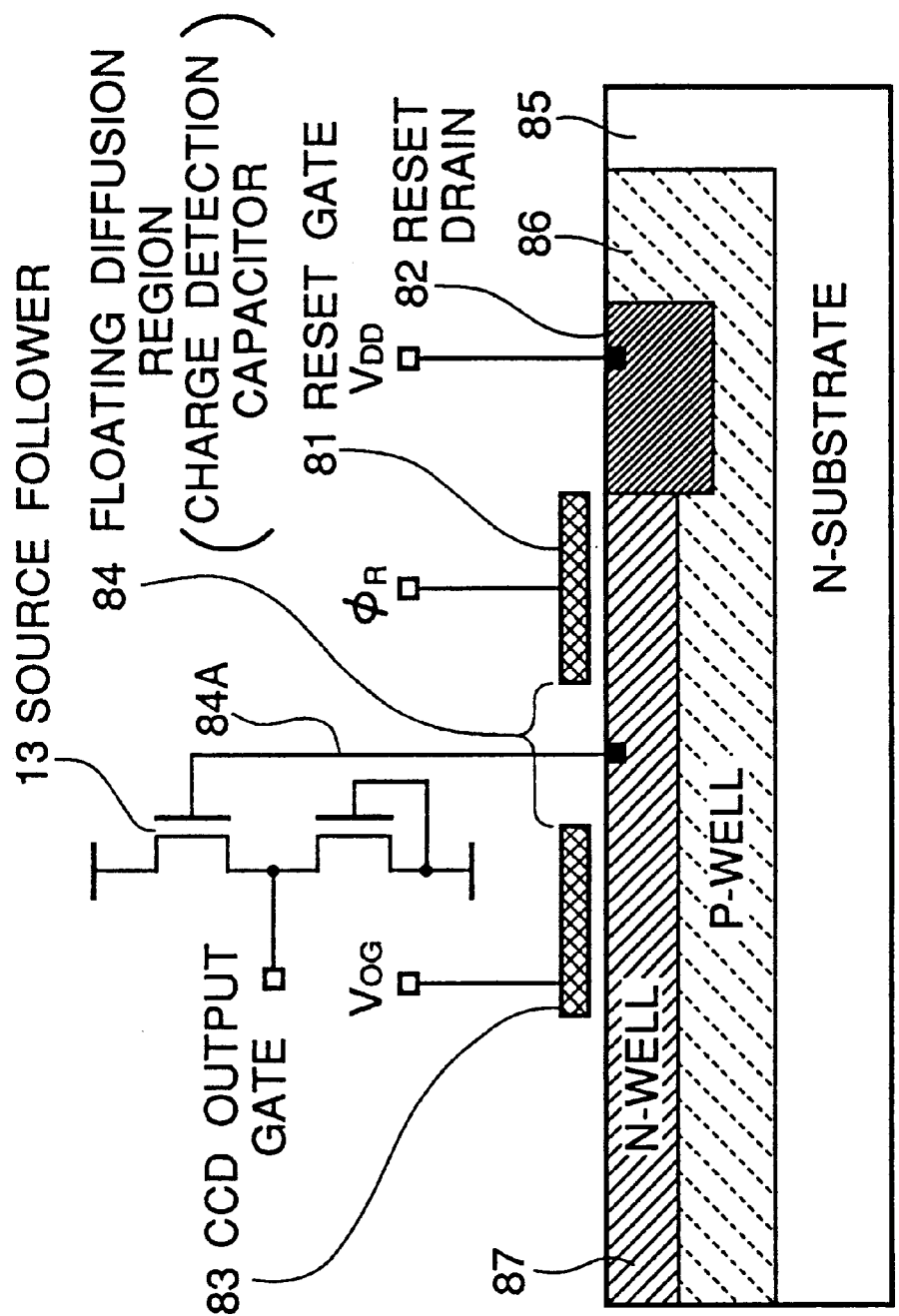
FIG. 2 is a partial diagrammatic sectional view of an output part of the CCD structure including a typical FDA type charge detection device, in combination with potential diagrams showing changes of potentials at various portions with lapse of the time, for illustrating a charge transfer process.
Figures 2B, 2C, 2D, 2E:
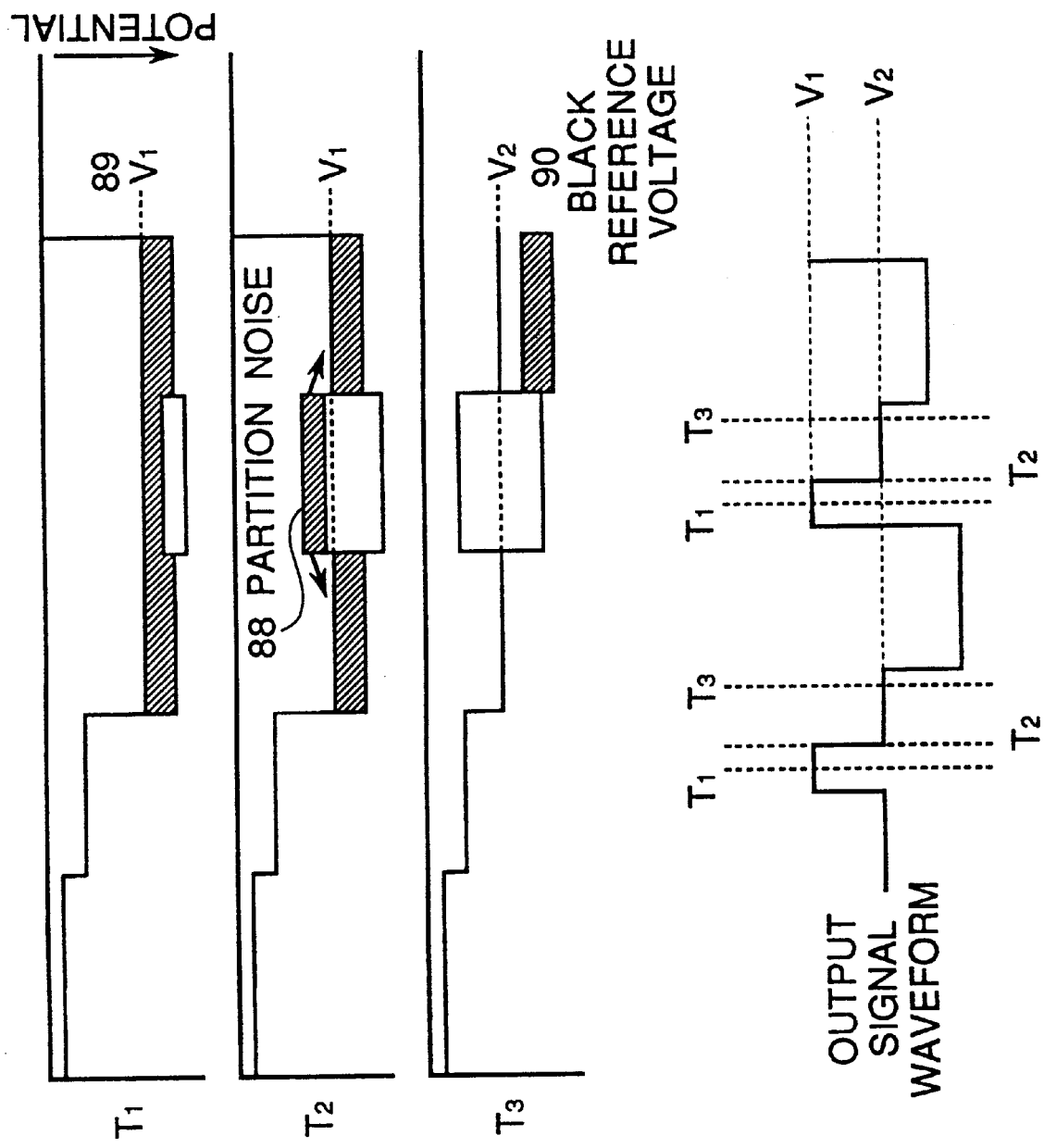

The charge detection circuit 9 includes a transistor 11 corresponding to the reset transistor formed of the reset drain 82, the reset gate 81 and the floating diffusion region 84 shown in FIG. 2, and a capacitor 12 corresponding to the charge detection capacitor 84 between the floating diffusion region and the P-well 86 shown in FIG. 2. A drain of the transistor 11 is connected to a voltage supply voltage $V_{DD}$, and a gate of the transistor 11 is connected to receive a reset pulse φR.

A connection node A between the reset transistor 11 and the charge detection capacitor 12 is connected to a gate of an NMOS transistor 130 having a drain connected to the voltage supply voltage $V_{DD}$ and a source connected to ground through a PMOS transistor 132 connected in the form of an active load. Therefore, the transistors 130 and 132 constitutes a source follower.

The source of the NMOS transistor 130 is connected to a gate of a source-grounded NMOS transistor 140 in the inverting amplifier 14. A drain of the NMOS transistor 140 is connected to the voltage supply voltage $V_{DD}$ through an NMOS transistor 142 connected in the form of an active load, which functions as a resistive load.

A connection node B between the NMOS transistors 140 and 142 is connected through a capacitor 18 to a node C, which is connected to a gate of a source-grounded NMOS transistor 150 in the inverting amplifier 15.

A drain of the NMOS transistor 150 is connected to the voltage supply voltage $V_{DD}$ through an NMOS transistor 152 connected in the form of an active load, which functions as a resistive load.

The node C is also connected to a source of an NMOS transistor 16 in the clamp circuit 10, which has a gate connected to receive a clamp pulse 20 and a drain connected to a clamp voltage supply 17.

A connection node D between the NMOS transistors 150 and 152 is connected a gate of an NMOS transistor 134 in the source follower 13B, which has a drain connected to the voltage supply voltage $V_{DD}$ and a source connected to ground through a PMOS transistor 136 connected in the form of an active load.

In the above mentioned signal processing circuit, when the reset pulse 19 is brought to a high level, the reset transistor 11 is turned on, and when the clamp pulse 20 is brought to a high level, the clamp transistor 16 is turned on.

Now, operation of the signal processing circuit shown in FIG. 4 will be described with reference to the timing chart of FIG. 5 illustrating the operation of the signal processing circuit shown in FIG. 4. As shown in FIG. 5, the clamp pulse is generated just after the reset pulse is generated and extinguished.

A signal 23 (containing a signal voltage component 24 and a reset noise component 22) on the node A outputted from the FD type charge detection circuit 9 is inverted by the inverting amplifier 14 to an inverted signal shown in the waveform at the node B. The inverted signal is supplied to the clamp circuit 10. In the clamp circuit 10, an offset voltage of the inverted signal B is converted to a different offset voltage corresponding to the voltage of the clamp voltage supply 17, as shown shown in the waveform at the node C. This signal is furthermore applied to the second inverting amplifier 15, where the reset noise 22 included in the signal 23 is suppressed or removed. Thereafter, the reset-noise suppressed signal outputted on the node D from the second inverting amplifier, is current-amplified by the source follower 13B, and outputted as a signal output.

Here, the clamp level is set to a reference voltage corresponding to a black level. Therefore, a portion higher than the black level is the reset noise, and namely, is an essentially unnecessary portion.

Next, why the reset noise is suppressed in the second inverting amplifier, will be explained with reference to FIG. 6, which is an input-output characteristic graph of the second inverting amplifier.

In the second inverting amplifier 15, if the gate voltage of the transistor 150 elevates from 0 V and becomes higher than a threshold voltage $Vt_2$ of the transistor 150, there is obtained a gain G determined in accordance with the following equation by a transconductance $gm_2$ of the transistor 150, a channel conductance $gds_1$ of the load transistor 152, and a channel conductance $gds_2$ of the transistor 150.

$$G = -gm_2/(gds_1 + gds_1)$$

Figure 6A:
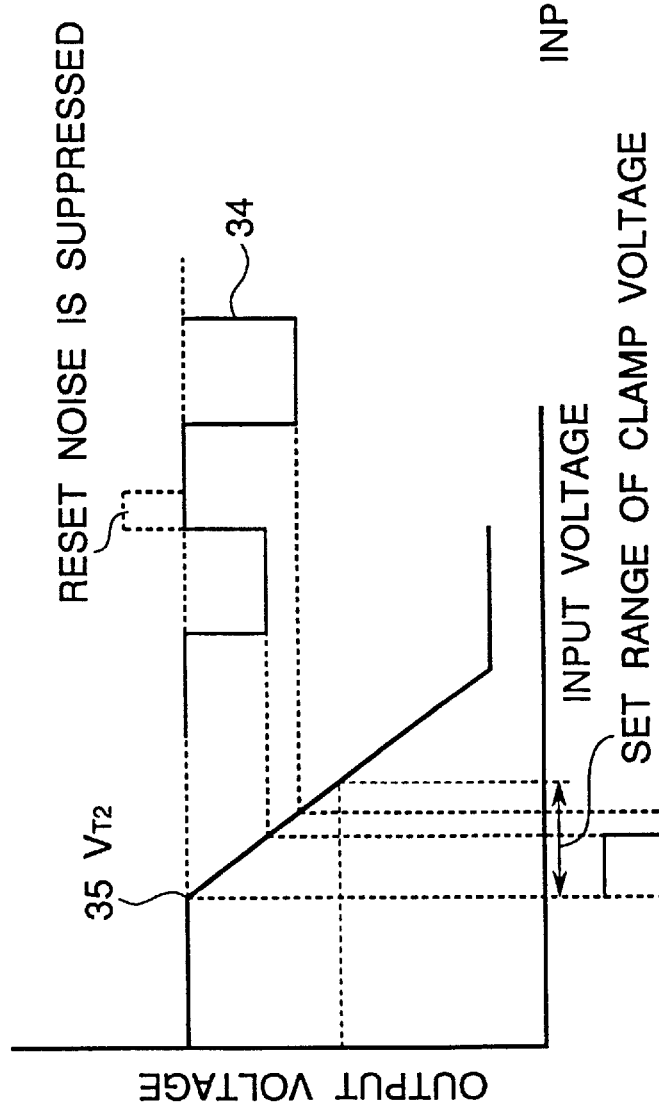
FIG. 6 is an input-output characteristic graph illustrating a method for determining an operating point in the first embodiment.
Figure 6B:
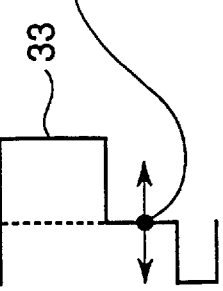

In the graph shown in FIG. 6, Reference Numeral 33 designates an input signal waveform applied to the second inverting amplifier, and Reference Numeral 34 designates an output signal waveform outputted from the second inverting amplifier.

In this inverting amplifier, if the black reference voltage of the input signal is made the same as the threshold voltage $Vt_2$ of the input transistor 150, when a voltage signal (reset noise) lower than the black reference voltage is applied to the inverting amplifier, the transistor 150 operates in an cutoff region, and therefore, is put in an OFF condition. Accordingly, the reset noise is suppressed or removed as seen from FIG. 6.

In the first embodiment, therefore, the clamp voltage of the clamp voltage supply 17 is made equal to the threshold voltage $Vt_2$ of the input transistor 150.

In order to efficiently suppress or remove the reset noise in the first embodiment, it is sufficient if the clamp voltage is higher than the threshold voltage $Vt_2$ of the input transistor 150, but somewhat lower than an intermediate point in an operating range of the inverting amplifier.

Figure 7:
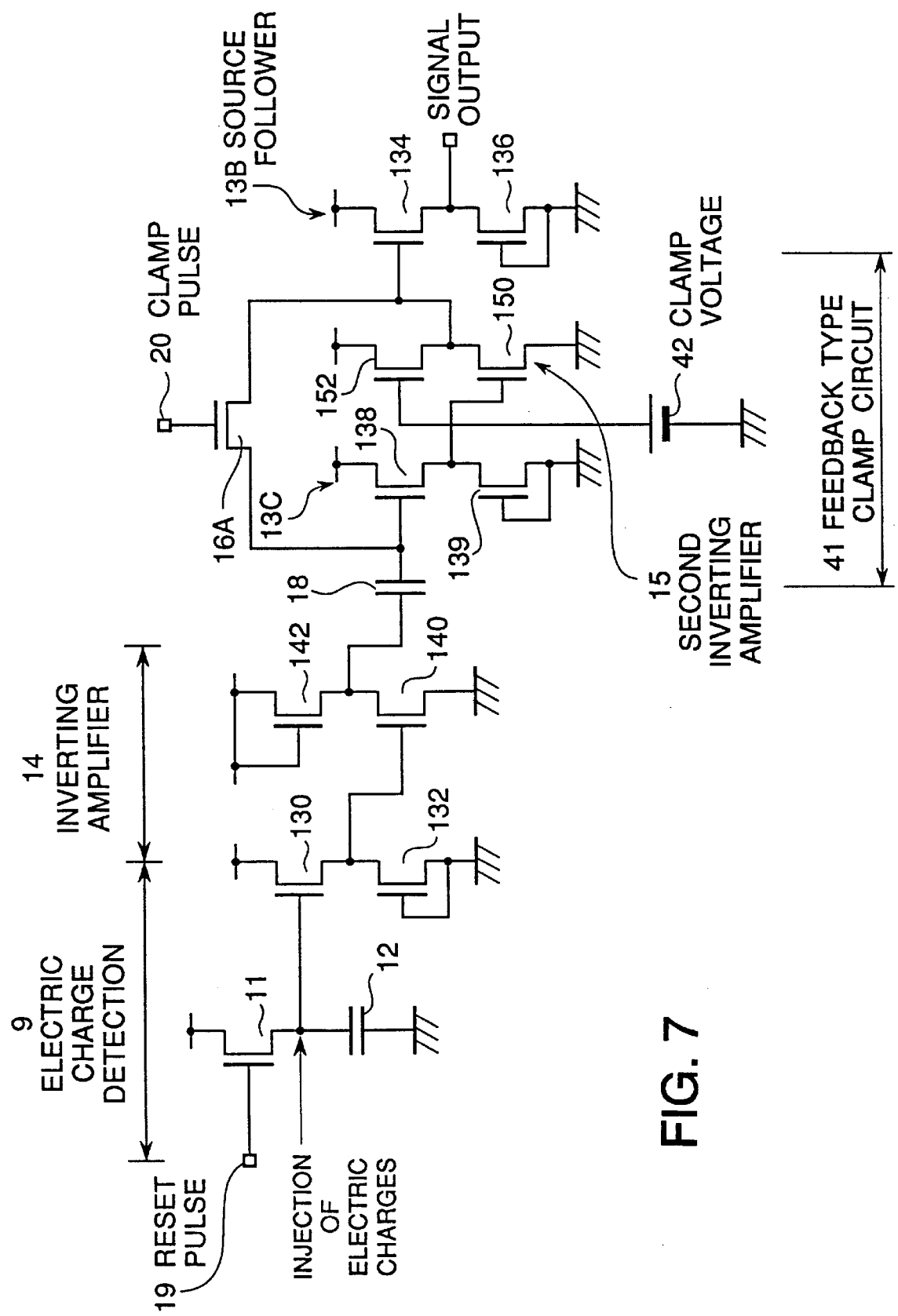
FIG. 7 is a circuit diagram similar to that of FIG. 4, but showing a second embodiment of the signal processing circuit in accordance with the present invention including a function for cancelling the reset noise.

Referring to FIG. 7, there is shown a circuit diagram of a second embodiment of the signal processing circuit in accordance with the present invention. In FIG. 7, elements corresponding to those shown in FIG. 4 are given the same Reference Numerals, and explanation thereof will be omitted.

As seen from comparison between FIGS. 4 and 7, the second embodiment is different from the first embodiment in that the clamp circuit of the second embodiment is of the feedback type, and the method in the second embodiment for determining the operating point (clamp voltage) is different from that in the first embodiment.

In detail, the connection node between the NMOS transistors 140 and 142 is connected through the capacitor 18 to the gate of an NMOS transistor 138, which in turn has a drain connected to the voltage supply voltage $V_{DD}$, and a source connected to ground through an NMOS transistor 139 connected in the form of an active load. Namely, the NMOS transistors 138 and 139 constitutes a source follower 13C.

A connection node between the NMOS transistors 138 and 139 is connected to the gate of the source-grounded NMOS transistor 150 in the inverting amplifier 15. The drain of the NMOS transistor 150 is connected to the voltage supply voltage $V_{DD}$ through the NMOS load transistor 152 having a gate connected to a clamp voltage supply 42.

In addition, an NMOS transistor 16A having a gate connected to receive a clamp pulse 20, is connected between the gate of the NMOS transistor 138 and the drain of the NMOS transistor 150.

Now, the method in the second embodiment for determining the operating point (clamp voltage) will be described with reference to FIG. 8, which is a characteristic graph in the feedback type clamp circuit.

In the graph shown in FIG. 8, the operating point in the feedback type clamp circuit lies on a point where the input signal and the output signal have the same voltage. It could be easily understood that this point is on a line inclined with 45 degrees in the graph.

In order to suppress or remove the reset noise, it is necessary to set this operating point equal to a voltage on which the transistor 150 is turned on, similarly to the first embodiment. This input-output characteristics of the inverting amplifier is expressed by the curve Y in the graph of FIG. 8.

In addition, the curve X in the graph of FIG. 8 shows an input-output characteristics when the gate voltage $V_1$ of the load transistor 152 is made equal to the voltage supply voltage $V_{DD}$. Accordingly, by making the gate voltage $V_1$ of the load transistor 152 lower than the voltage supply voltage $V_{DD}$, it is possible to make the curve X consistent with the curve Y. Thus, the operating point is made equal to a voltage on which the transistor 150 is turned on, so that the reset noise is efficiently suppressed or removed.

If the gate voltage of the load transistor 152 is lowered, a current flowing through the load transistor 152 decreases, and therefore, an output voltage of the inverting amplifier 15 also drops. Accordingly, it becomes possible to adjust or set the operating point by lowering the gate voltage of the load transistor 152, namely, the voltage $V_1$ of the clamp voltage supply 42.

Figure 9A:
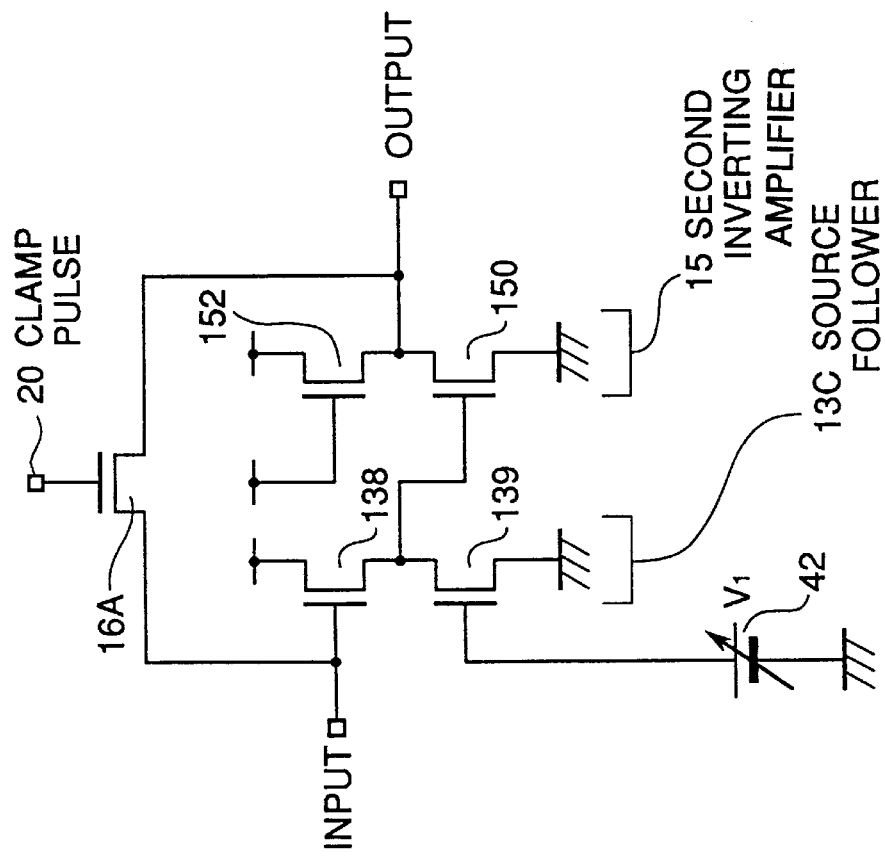
FIG. 9A is a circuit diagram of the feedback type clamp circuit included in a third embodiment of the signal processing circuit.

Referring to FIG. 9A, there is shown a circuit diagram of a feedback type clamp circuit included in a third embodiment, which can be replaced with the feedback type clamp circuit included in the second embodiment.

Figure 9B:
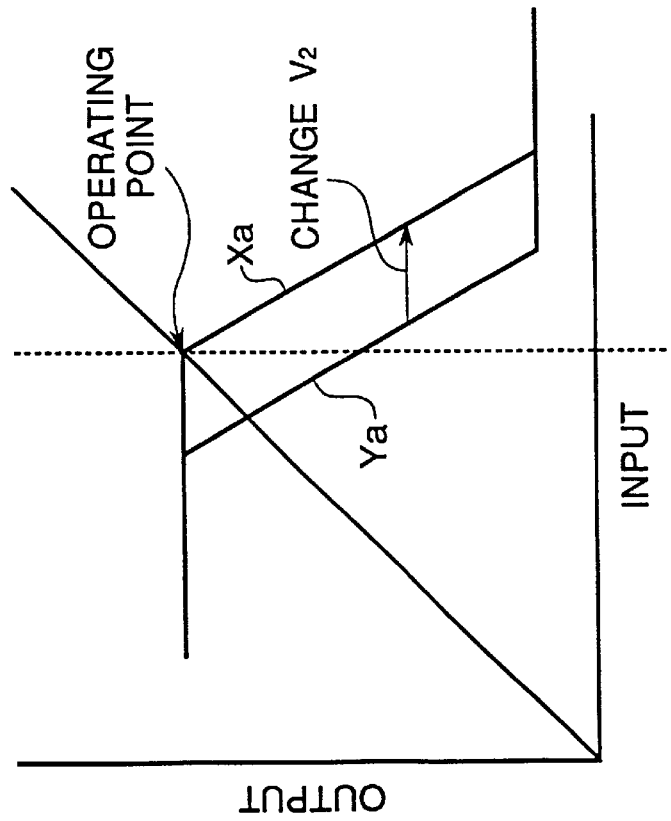
FIG. 9B is a characteristic graph illustrating a method for determining an operating point in the feedback type clamp circuit shown in FIG. 9A.

As seen from comparison between FIGS. 8 and 9B, this third embodiment is different from the second embodiment in that a gate of the transistor 139 is connected to the clamp voltage supply 42, and the gate of the load transistor 152 is connected to the voltage supply voltage $V_{DD}$. Namely, the third embodiment is characterized in that the operating point is determined by changing the characteristics of the source follower in the feedback loop, in place of lowering the gate voltage of the load transistor 152 in the second inverting amplifier 15.

Referring to FIG. 9B, there is shown a characteristic graph illustrating a method for determining an operating point in this modification. In the graph of FIG. 9B, the curve Ya shows an input-output characteristics when the gate voltage of the load transistor 139 is equal to the ground level, and the curve Xa indicates the input-output characteristics of the inverting amplifier when the operating point is set equal to a voltage on which the transistor 150 is turned on.

By changing the gate voltage of the transistor 139, the current flowing through the source follower 13C can be changed. Accordingly, the input voltage applied to the second inverting amplifier changes, so that the characteristics can be changed as shown in FIG. 9B. Thus, the operating point can be determined similarly to the first and second embodiments.

As seen from the above, the present invention is characterized in that the operation point of the second inverting amplifier is equivalently set at such a voltage that the transistor is turned on the reference voltage corresponding to the black level. In the first embodiment, the operating point is set by setting the clamp voltage in the clamp circuit, and in the second and third embodiments, the operating point is set by setting the current passing through the inverting amplifier or the source follower.

Therefore, it would be apparent to persons skilled in the art that the setting of the operating point of the inverting amplifier is not limited to the first to third embodiments, and can be realized by other various manners. In other words, it should be understood that the present invention includes any fashions or modifications in that the inverting amplifier is so set that the reset noise applied to the inverting amplifier is a cut-off region ($V_G - V_T \geq 0$) of an active transistor of the inverting amplifier.

As seen from the above, the signal processing circuit in accordance with the present invention for the solid image sensor can efficiently suppress or remove the reset noise. In addition, the reset noise equivalent signal generating circuit and the differential amplifier which were required in the prior art circuit, are no longer necessary. Accordingly, the occupying area for the circuit required for suppressing the reset noise can be reduced to about two thirds of that required in the prior art circuit which has needed the reset noise equivalent signal generating circuit and the differential amplifier.

Furthermore, since the differential amplifier is no longer necessary, it becomes unnecessary to design the differential amplifier, and therefore, it is possible to shorten the design time required for obtaining the same performance as that of the prior art circuit.

In the above mentioned embodiments, the NMOS transistors have been used, but it would be apparent to persons skilled in the art that the NMOS transistors can be replaced with PMOS transistors, and in such a case, a source of the PMOS transistors is connected to the voltage supply voltage.

The invention has thus been shown and described with reference to the specific embodiments. However, it should be noted that the present invention is in no way limited to the details of the illustrated structures but changes and modifications may be made within the scope of the appended claims.

I claim:

1. A signal processing circuit for a solid state image sensor, the signal processing circuit including a charge detection circuit for outputting a signal output from the image sensor, a first inverting amplifier receiving said signal output, a source follower receiving an output of said first inverting amplifier, a second inverting amplifier receiving an output of said source follower, a switching means connected between an output of said second inverting amplifier and an input of said source follower to construct a feedback type clamp circuit, said second inverting amplifier including a source-grounded first MOS transistor having a gate connected to receive said output of said source follower, an operating voltage being set to be not smaller than a threshold of said first MOS transistor but smaller than an intermediate voltage of an operating voltage range of said second inverting amplifier.

2. A signal processing circuit claimed in claim 1 wherein said charge detection circuit includes a reset transistor having a gate receiving a reset pulse and a drain connected to a voltage supply voltage and a charge detection capacitor connected to a source of said reset transistor, said signal output being outputted from a connection node between said reset transistor and said charge detection capacitor, wherein said source follower includes a second MOS transistor having a gate connected to receive said output of said first inverting amplifier and a drain connected to said voltage supply voltage, a source of said second MOS transistor being connected to ground through a first active load and also connected to said gate of said first MOS transistor, a drain of said first MOS transistor being connected to said voltage supply voltage through a third MOS transistor having a gate connected to a clamp voltage, and wherein said switching means includes a fourth MOS transistor connected between said gate of said second MOS transistor and said drain of said first MOS transistor, a gate of said fourth MOS transistor being connected to receive a clamp pulse which is generated after said reset pulse disappears.

3. A signal processing circuit claimed in claim 2 wherein said first inverting amplifier includes a source-grounded fifth MOS transistor having a gate connected to receive said signal output, and a drain connected through a second active load to said voltage supply voltage and also connected through a capacitor to said gate of said second MOS transistor.

4. A signal processing circuit claimed in claim 1 wherein said charge detection circuit includes a reset transistor having a gate receiving a reset pulse and a drain connected to a voltage supply voltage and a charge detection capacitor connected to a source of said reset transistor, said signal output being outputted from a connection node between said reset transistor and said charge detection capacitor, wherein said source follower includes a second MOS transistor having a gate connected to receive said output of said first inverting amplifier and a drain connected to said voltage supply voltage, a source of said second MOS transistor being connected to ground through a third MOS transistor having a gate connected to a clamp voltage, said source of said second MOS transistor being also connected to said gate of said first MOS transistor, a drain of said first MOS transistor being connected to said voltage supply voltage through a first active load, and wherein said switching means includes a fourth MOS transistor connected between said gate of said second MOS transistor and said drain of said first MOS transistor, a gate of said fourth MOS transistor being connected to receive a clamp pulse which is generated after said reset pulse disappears.

5. A signal processing circuit claimed in claim 4 wherein said first inverting amplifier includes a source-grounded fifth MOS transistor having a gate connected to receive said signal output, and a drain connected through a second active load to said voltage supply voltage and also connected through a capacitor to said gate of said second MOS transistor.

6. A signal processing circuit for a solid state image sensor, including a charge detection circuit for outputting a signal output from the image sensor, a first inverting amplifier receiving said signal output, and a second inverting amplifier having a source-grounded MOS transistor having a gate connected to receive an output of said first inverting amplifier, a threshold of the MOS transistor being set to be the same as a black reference voltage in the input signal applied to said MOS transistor, so that a reset noise included in said signal output from said image sensor is removed.

* * * * *